United States Patent
Inoue et al.

(10) Patent No.: US 8,108,719 B2
(45) Date of Patent: Jan. 31, 2012

(54) INFORMATION PROCESSING DEVICE AND FAILURE CONCEALING METHOD THEREFOR

(75) Inventors: Hiroaki Inoue, Tokyo (JP); Masamichi Takagi, Tokyo (JP); Masayuki Mizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 185 days.

(21) Appl. No.: 12/441,289

(22) PCT Filed: Sep. 13, 2007

(86) PCT No.: PCT/JP2007/067829
§ 371 (c)(1),
(2), (4) Date: Mar. 13, 2009

(87) PCT Pub. No.: WO2008/044423
PCT Pub. Date: Apr. 17, 2008

(65) Prior Publication Data
US 2009/0240980 A1 Sep. 24, 2009

(30) Foreign Application Priority Data
Oct. 13, 2006 (JP) .................... 2006-279956

(51) Int. Cl.
*G06F 11/00* (2006.01)
(52) U.S. Cl. ........................................ 714/13
(58) Field of Classification Search ........ 714/13
See application file for complete search history.

(56) References Cited

U.S. PATENT DOCUMENTS

| | | | | |
|---|---|---|---|---|
| 5,613,060 A | * | 3/1997 | Britton et al. | 714/15 |
| 6,397,345 B1 | * | 5/2002 | Edmonds et al. | 714/4.4 |
| 7,409,420 B2 | * | 8/2008 | Pullara et al. | 709/203 |

FOREIGN PATENT DOCUMENTS

| | | |
|---|---|---|
| JP | 1990123455 A | 5/1990 |
| JP | 1991240859 A | 10/1991 |
| JP | 1995175765 A | 7/1995 |
| JP | 1999126195 A | 5/1999 |
| JP | 2000181889 A | 6/2000 |
| JP | 2000339186 A | 12/2000 |
| JP | 2003271399 A | 9/2003 |
| JP | 2005004289 A | 1/2005 |
| JP | 2005032202 A | 2/2005 |
| JP | 2005038445 A | 2/2005 |
| JP | 2005250577 A | 9/2005 |

OTHER PUBLICATIONS

International Search Report for PCT/JP2007/067829 mailed Dec. 11, 2007.

* cited by examiner

*Primary Examiner* — Amine Riad (57) ABSTRACT

An information processing device comprises a plurality of processing units on which OSs and execution environments operate, and shared peripheral devices shared by the plurality of processing units. The information processing device is provided with a failure concealing device for concealing a failure which has occurred in a processing unit. The failure concealing device determines a substitutional processing unit that will act as a substitute for a failed processing unit so that the OS and execution environment which have operated on the failed processing unit will operate on the substitutional processing unit, switches the OS and execution environment which have operated on the failed processing unit so that they will operate on the substitutional processing unit, and switches a shared resource used by the failed processing unit such that it is available to the substitutional processing unit.

12 Claims, 12 Drawing Sheets

INFORMATION PROCESSING DEVICE AND FAILURE CONCEALING METHOD THEREFOR

This application is the National Phase of PCT/JP2007/067829, filed Sep. 13, 2007, which is based upon and claims the benefit of priority from Japanese patent application No. 2006-279956, filed on Oct. 13, 2006, the disclosure of which is incorporated herein in its entirety by reference.

TECHNICAL FIELD

The present invention relates to an information processing device for concealing a failure which has occurred in a processor from system software and a failure concealing method therefor.

BACKGROUND ART

Semiconductor integrated circuit devices have maintained their reliability with the aid of testing technologies for new failure modes in line with advances in miniaturization and high-speed testing technologies which support an increased high integration. In recent years, however, due to an increase in cost for testing, it is desirable to improve the reliability of semiconductor integrated circuit devices not only by improvements in testing methods but also by improved design ideas on the system side that include the use of semiconductor integrated circuit devices.

Figure 1:
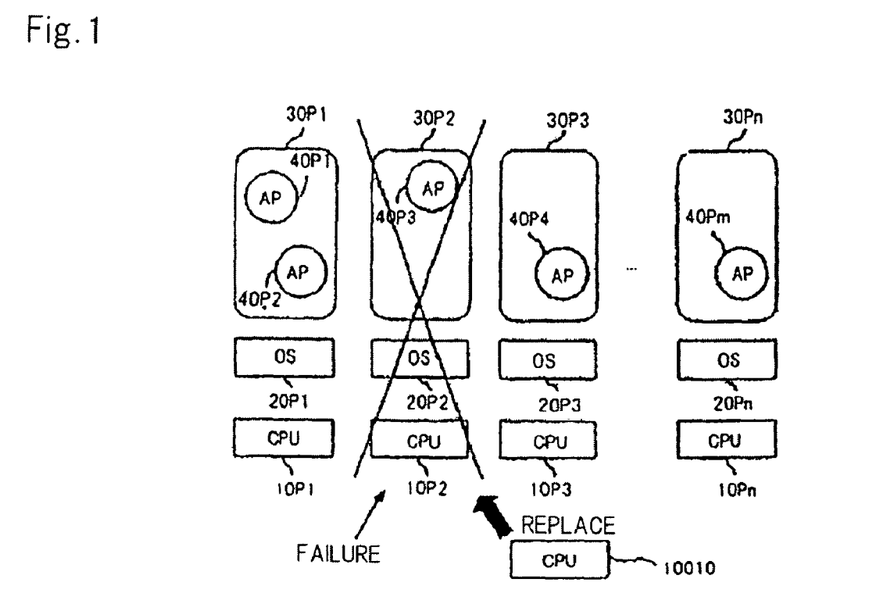
FIG. 1 is a block diagram schematically showing a failure concealing method of a first related art.

FIG. 1 is a block diagram schematically showing a failure concealing method of a first related art.

The failure concealing method of the first related art is an example of concealing a failure by replacing a failed chip.

An information processing device shown in FIG. 1 comprises a plurality of CPUs 10P1-Pn (n is a positive integer), and is configured to cause CPUs 10P1-Pn to operate with OSs 20P1-Pn and execution environments 30P1-Pn for desired applications (AP) 40P1-Pm (m is a positive integer). The execution environment refers to software (program) which is different from the OS required to execute applications 40P1-Pm.

In the failure concealing method of the first related art, upon detection of a failure which has occurred, for example, in CPU 10P2, CPU 10P2 is replaced with normal CPU 10010, and application 40P3 is executed by this CPU 10010 under OS 20P2 and execution environment 30P2, thereby concealing the failure which has occurred in CPU 10P2 from the system software.

Figure 2:
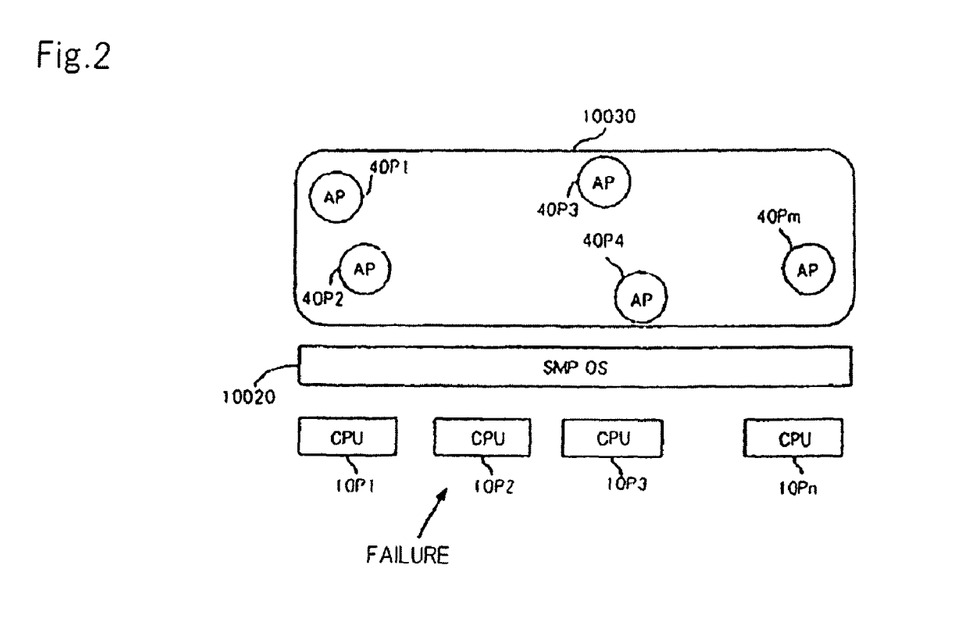
FIG. 2 is a block diagram schematically showing a failure concealing method of a second related art.

FIG. 2 is a block diagram schematically showing a failure concealing method of a second related art.

The failure concealing method of the second related art is an example of concealing a failure by OS which implements symmetric multiprocessing (SMP) (called "SMP OS").

An information processing device shown in FIG. 2 comprises a plurality of CPUs 10P1-Pn, and is configured to cause CPUs 10P1-Pn to operate with SMP OS 10020 and execution environments 30P1-Pn for desired applications 40P1-Pm.

In the failure concealing method of the second related art, upon detection of a failure which has occurred, for example, in CPU 10P2, an execution queue of CPU 10P2 is masked by processing carried out by SMP OS 10020 to prevent the CPU, in which the failure has been detected, from executing an application.

Figure 3:
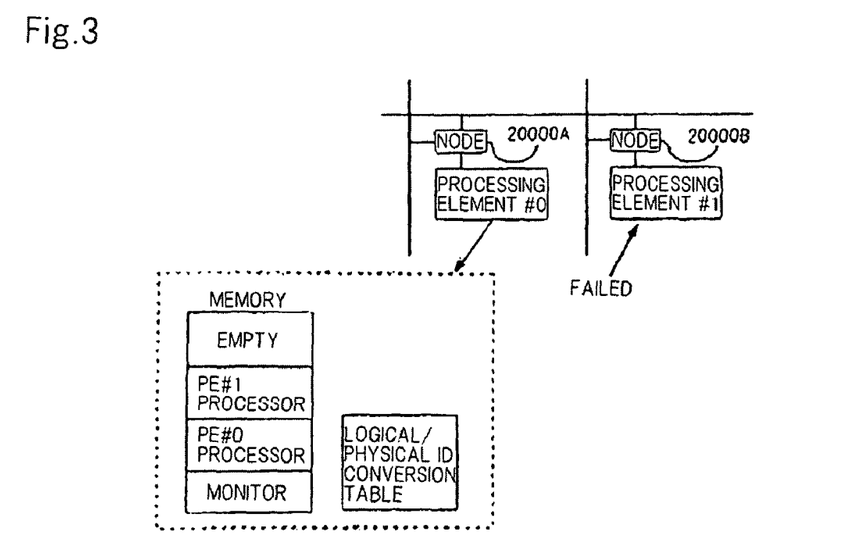
FIG. 3 is a block diagram schematically showing a failure concealing method of a third related art.

FIG. 3 is a block diagram schematically showing a failure concealing method of a third related art.

An information processing device shown in FIG. 3 comprises a plurality of processing elements (only processing elements #0, #1 are shown in FIG. 3), and node switches 20000A, 20000B for shutting off processing elements #0, #1 from the system. Processing element #0, #1 comprises a memory for storing programs for executing processing, and a logical/physical ID conversion table for holding a correspondence relationship between programs and processing elements which execute the programs. The configuration shown in FIG. 3 may be represented, for example, by a multiprocessor system which is described, for example, in Japanese Patent Laid-Open No.-2-123455.

In the failure concealing method of the third related art, when processing element #1, for example, fails, a program executed by processing element #1 is transferred to processing element #0, and processing element #1 is shut off from the system by node switch 20000B.

Then, the logical/physical ID conversion tables provided in all the processing elements register the state that processing element #0 (physical ID) executes programs for processing element #1 (logical ID). Subsequently, when each processing element transmits data to processing element #1, it transfers the data to processing element #0 with reference to the logical/physical ID conversion table 20030.

Among the failure concealing methods described above, however, the failure concealing method of the first related art requires human manipulation in the concealment of a failure, so that the operation of the system must be stopped during the manipulations to conceal failure. Also, in a configuration in which a plurality of CPUs are incorporated in a semiconductor integrated circuit device, the entire chip including normal CPUs must be replaced.

On the other hand, the failure concealing method of the second related art cannot be applied to a system in which a plurality of OSs run because all CPUs run under the SMP OS.

Also, the failure concealing method of the third related art cannot be applied to a system which comprises shared resources (shared peripherals) that comprise hardware and software for implementing a timer, CPU ID, interrupt processing and the like, because respective CPUs (processing elements) comprise resources independent of one another. Further, in the failure concealing method of the third related art, when each CPU is provided with cache memory, data temporarily held by the cache memory can be lost.

As appreciated from the above, even with the aforementioned failure concealing methods of the related art applied to an information processing device which comprises a plurality of CPUs and shared resources, a plurality of OSs cannot be continuously operated if any CPU fails, unless an associated chip is replaced.

SUMMARY

Accordingly, it is therefore an object of the exemplary aspect of the invention to provide an information processing device comprising a plurality of CPUs and shared resources, and which is capable of continuously running a plurality of OSs even if a failure occurs, without replacing a chip, and a failure concealing method therefor.

To achieve the above object, in an exemplary aspect of the invention, a failure concealing device is provided for concealing a failure which has occurred in a processing unit in an information processing device which comprises a plurality of processing units on which OSs and execution environments operate, and shared peripheral devices shared by the plurality of processing units. The failure concealing device determines a substitutional processing unit which operates in place of the failed processing unit, switches an OS and an execution environment which have operated on the failed processing unit, to operations that will be executed by the substitutional processing unit, and switches a shared resource used by the failed processing unit such that it is available to the substitutional processing unit.

EXEMPLARY EMBODIMENT

Next, the present invention will be described with reference to the drawings.

Figure 4:
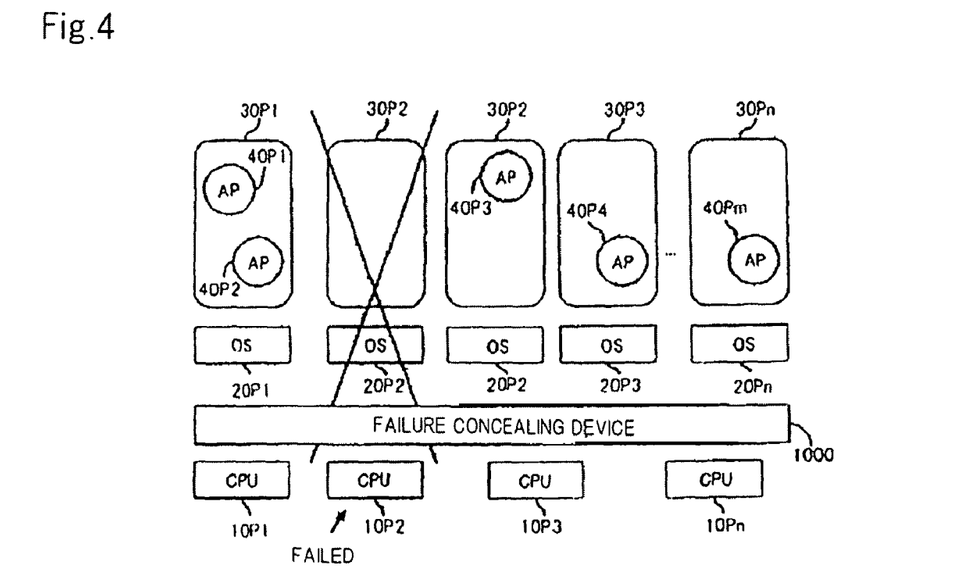
FIG. 4 is a block diagram schematically showing a failure concealing method of the exemplary aspect of the invention.

FIG. 4 is a block diagram schematically showing a failure concealing method of the exemplary aspect of the invention.

As shown in FIG. 4, the failure concealing method of the exemplary aspect of the invention is a method of concealing a failure, which has occurred in any of CPUs (processing devices) 10P1-Pn, from system software by failure concealing device 1000 in an information processing device which comprises CPU 10P1-Pn and failure concealing device 1000. CPUs 10P1-Pn operate with OSs 20P1-Pn and execution environments 30P1-Pn for desired applications 40P1-Pm in a manner similar to the information processing devices of the related arts.

When any of CPUs 10P1-Pn fails, failure concealing device 1000 determines a substitutional CPU (alternative CPU) that will act as a substitute for the failed CPU so that the OS and execution environment which have operated on the failed CPU will operate on the substitutional CPU, and switches the OS and execution environment with which the failed CPU has operated to operations by the alternative CPU. Also, failure concealing device 1000 allows the alternative CPU to use shared resources which have been used by the failed processing unit.

While FIG. 4 shows an example in which CPUs 10P1-Pn correspond one-to-one with OSs 20P1-Pn, CPUs and OSs need not correspond one-to-one with each other, and the configuration may comprise, for example, a plurality of CPUs 10P1-Pn that operate with an SMP OS. Also, the OS on which each CPU 10P1-Pn operates may be the same or different. Also, as long as CPUs 10P1-Pn are configured to operate in accordance with a program (OS or application), they may be of any type, such as VLIW (Very Long Instruction Word) type, thread type, SIMD (Single Instruction/Multiple Data) type, DSP (Digital Signal Processor), and the like. Further, CPUs 10P1-Pn shown in FIG. 4 need not be contained in separate packages, respectively, but may be incorporated in SoC (system-on-Chip), incorporated in Sip (System-in-Package) as individual chips, or may be combined with individual packages, SoC or Sip, by way of example. Failure concealing device 1000 can implement its functions by hardware comprised of logic circuits, memories and the like, or by a CPU or the like which executes predetermined processing in accordance with a program.

Figure 5:
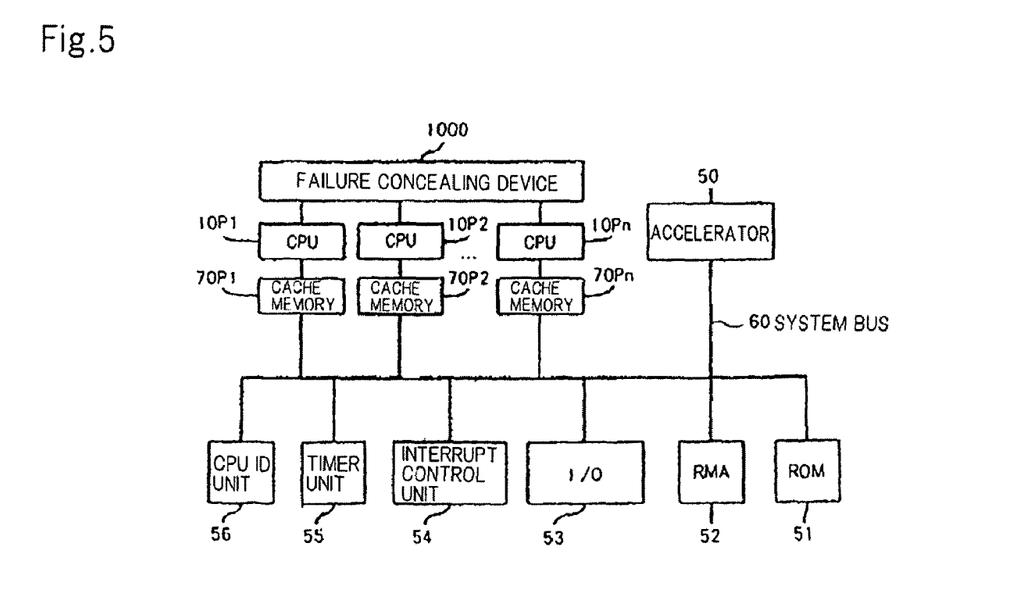
FIG. 5 is a block diagram showing an exemplary configuration of an information processing device of the exemplary aspect of the invention.

FIG. 5 is a block diagram showing an exemplary configuration of the information processing device of the exemplary aspect of the invention.

FIG. 5 shows an exemplary configuration of a platform which implements functions of a mobile terminal device, as an example of the information processing device. When the information processing device is not a mobile terminal device, components not required by the device may be omitted from among components shown in FIG. 5.

As shown in FIG. 5, the information processing device comprises a plurality of CPUs 10P1-Pn, cache memories 70P1-Pn, accelerator 50, ROM 51, RAM 52, input/output unit interface (I/O) 53, interrupt control unit 54, timer unit 55, and CPU ID unit 56, all of which are interconnected through system bus 60.

CPUs 10P1-Pn, cache memories 70P1-Pn, accelerator 50, ROM 51, RAM 52, input/output unit interface 53, interrupt control unit 54, timer 55, and CPU ID unit 56 need not be encapsulated by separate packages, respectively, but may be incorporated in SoC, incorporated in SiP as individual chips, or combined with separate packages, SoC, and SiP, by way of example.

ROM 51 and RAM 52 are commonly used by CPUs 10P1-Pn in accordance with functions provided by the information processing device. ROM 51 and RAM 52 may be provided in any configuration, and may be in a multi-chip configuration or a multi-bank configuration provided that the cost does not constitute a problem.

Figure 6:
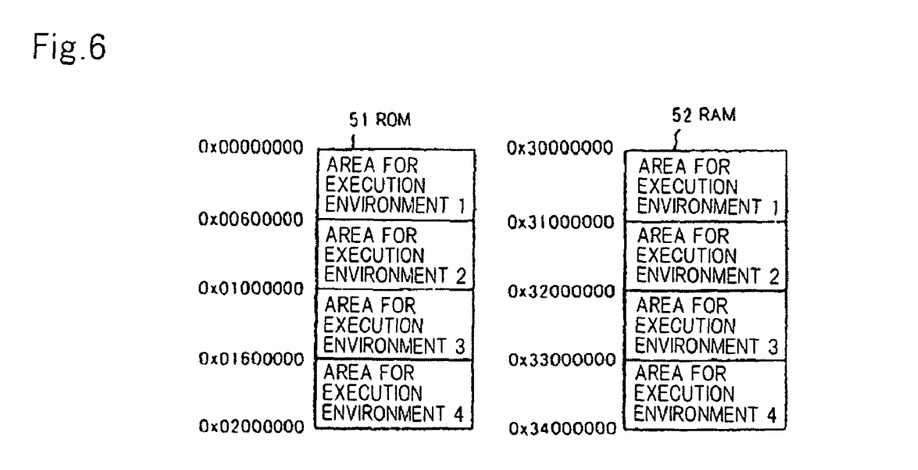
FIG. 6 is a schematic diagram showing an exemplary configuration of ROM and RAM shown in FIG. 5.

FIG. 6 is a schematic diagram showing an exemplary configuration of the ROM and RAM shown in FIG. 5.

As shown in FIG. 6, ROM 51 comprises, for example, a 32-MB storage area which has a start address at 0x00000000 and an end address at 0x01FFFFFF and which comprises four areas (8 MB) for execution environments.

RAM 52 comprises, for example, a 64-MB storage area which has a start address at 0x30000000 and an end address at 0x33FFFFFF, and comprises four areas (16 MB) for execution environments.

A RAM area utilized by execution environment 3 occupies 16 MB, for example, from 0x32000000 to 0x33FFFFFF, and a ROM area utilized by the same occupies 8 MB from 0x01000000 to 0x01FFFFFF.

A maximum memory capacity and laid-out addresses allocated to ROM 51 and RAM 52, as well as a maximum memory capacity and location addresses allocated to the areas for execution environments are not limited to the aforementioned values, but may be set to optimal values in accordance with the specifications and functions of the information processing device, as a matter of course.

Figure 7:
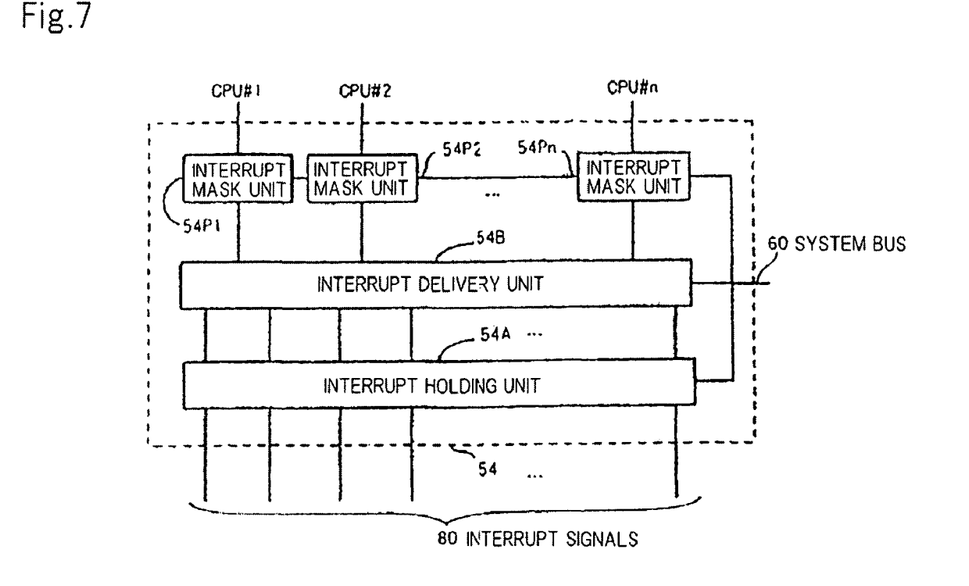
FIG. 7 is a block diagram showing an exemplary configuration of an interrupt control unit shown in FIG. 5.

FIG. 7 is a block diagram showing an exemplary configuration of the interrupt control unit shown in FIG. 5.

As shown in FIG. 7, interrupt control unit 54 comprises interrupt holding unit 54A applied with interrupt signals for holding main causes for generating interrupts, interrupt delivery unit 54B for determining a successor CPU for an interrupt signal, and interrupt mask units 54 P1-Pn for determining whether or not a CPU should be actually notified of an interrupt signal.

Interrupt holding unit 54A, interrupt delivery unit 54B, and interrupt mask units 54P1-Pn are connected to system bus 60, and can be reconfigured by CPUs 10P1-Pn, respectively.

Interrupt holding unit 54A, interrupt delivery unit 54B, and interrupt mask units 54 P1-Pn are not limited to the configuration shown in FIG. 7, but may be in any configuration as long as they can implement interrupt holding, interrupt delivery, and interrupt masking functions.

Figure 8:
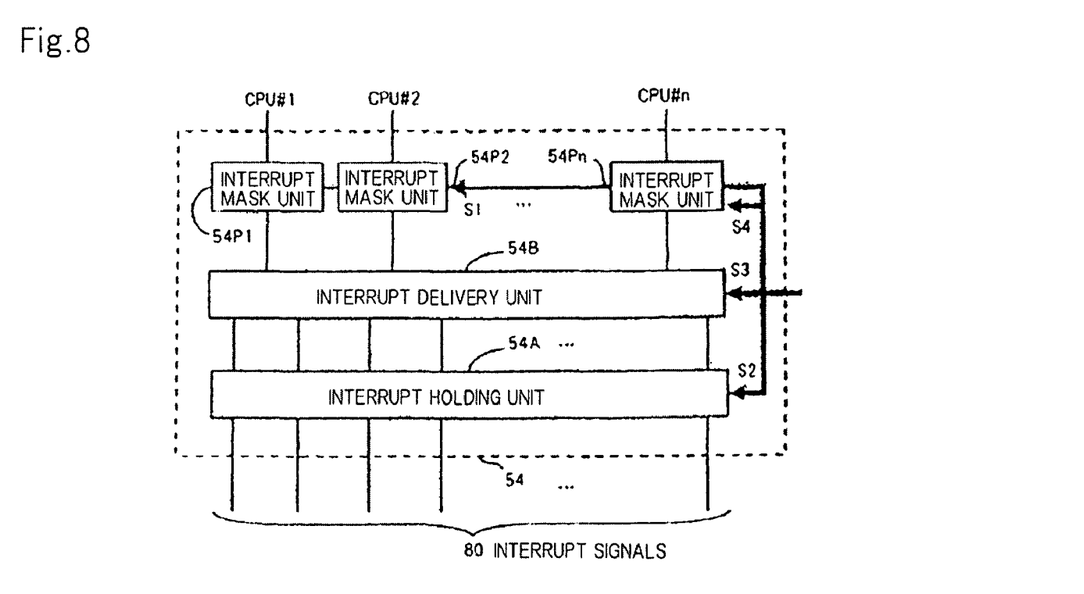
FIG. 8 is a block diagram schematically showing failure concealment processing by the interrupt control unit shown in FIG. 7.

FIG. 8 is a block diagram schematically showing failure concealment processing by the interrupt control unit shown in FIG. 7. S1-S4 shown in FIG. 8 indicate step numbers of the failure concealing processing by the interrupt control unit.

Here, a description will be given of an example in which CPU 10P2 fails, so that OS 20P2 and execution environment 30P2 executed by this CPU 10P2 are moved to CPU 10Pn to conceal the failure.

When CPU 10P2 fails, CPU 10Pn first masks all interrupt signals issued to CPU 10P2 by using interrupt mask unit 54 P2 (step S1).

Next, CPU 10Pn clears out a main cause for generating the interrupt signals destined to CPU 10P2, held by interrupt holding unit 54A (step S2).

Subsequently, CPU 10Pn changes settings of interrupt delivery unit 54B such that the interrupt signals destined to CPU 10P2 are delivered to CPU 10Pn (step S3).

Finally, CPU 10Pn removes a mask by using interrupt mask unit 54 Pn such that the interrupt signals destined to CPU 10P2 are delivered to CPU 10Pn (step S4).

Figure 9:
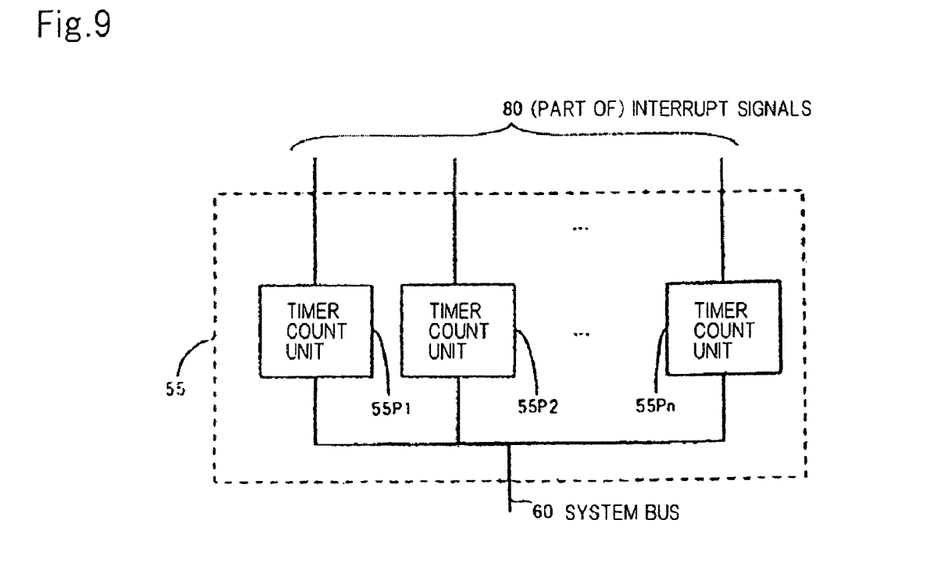
FIG. 9 is a block diagram showing an exemplary configuration of a timer unit shown in FIG. 5.

FIG. 9 is a block diagram showing an exemplary configuration of the timer unit shown in FIG. 5.

As shown in FIG. 9, timer unit 55 comprises a plurality of timer count units 55 P1-Pn connected to system bus 60.

Timer count unit 55 P1-Pn sends an interrupt signal at predetermined fixed intervals. As a timer value is set, for example, by a CPU, timer count unit 55 P1-Pn counts down that timer value, and sends an interrupt signal at the time the value reaches zero.

Timer count units 55 P1-Pn are provided to be utilized by CPU P1-Pn, respectively. Timer count units 55 P1-Pn can also be shared by a plurality of CPUs P1-Pn. When timer count units 55 P1-Pn are shared by a plurality of CPUs P1-Pn, the number of timer count units can be reduced.

Figure 10:
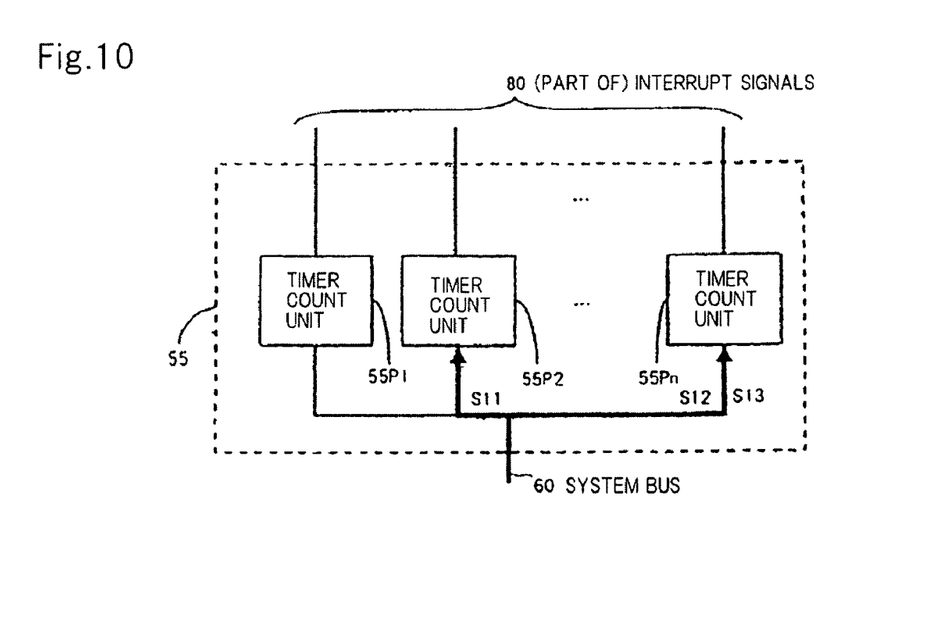
FIG. 10 is a block diagram schematically showing failure concealment processing by the timer unit shown in FIG. 9.

FIG. 10 is a block diagram schematically showing failure concealment processing by the timer unit shown in FIG. 9. S11-S12 shown in FIG. 10 indicate step numbers of the failure concealment processing implemented by the timer unit.

Here, a description will be given of an example in which CPU 10P2 fails, so that OS 20P2 and execution environment 30P2 executed by CPU 10P2 are moved to CPU 10Pn to conceal the failure. Assume that CPU 10Pn is executing OS 20Pn and execution environment 30Pn. In this event, CPU 10Pn executes SO 20Pn and execution environment 30Pn, which have been originally executed thereby, as well as OS 20P2 and execution environment 30P2 transferred from CPU 10P2 in time division. Also, CPU 10Pn utilizes timer count unit 55 Pn to execute OS 20Pn and execution environment 30Pn as well as OS 20P2 and execution environment 30P2, respectively, for every predetermined time.

When CPU 10P2 fails, CPU 10Pn first stops the operation of timer count unit 55 P2 (step S11).

Next, CPU 10Pn sets the same timer value as timer counter unit 55 P2 to timer count unit 55 Pn before executing OS 20P2 and execution environment 30P2 (step 12).

when a predetermined time elapses while CPU 10Pn is executing OS 20P2 and execution environment 30P2, CPU 10Pn changes a timer value for timer count unit 55 Pn in correspondence to the OS and execution environment which are next executed thereby (for example, OS 20Pn and execution environment 30Pn) (step S13).

Figure 11:
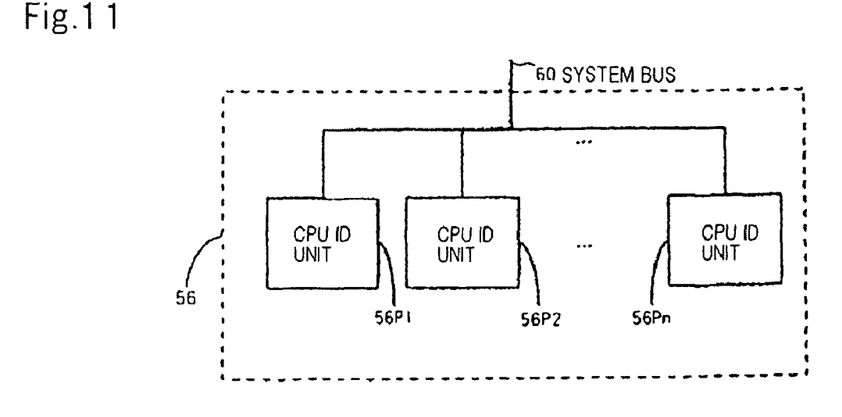
FIG. 11 is a block diagram showing an exemplary configuration of a CPU ID unit shown in FIG. 5.

FIG. 11 is a block diagram showing an exemplary configuration of the CPU ID unit shown in FIG. 5.

As shown in FIG. 11, CPU ID unit 56 comprises a plurality of CPU ID units 56 P1-Pn connected to system bus 60.

CPU ID units 56 P1-Pn included in the information processing device of the exemplary aspect of the invention provide the CPU ID for each CPU, and can change CPU ID using system software.

CPU ID units included in general systems can only read preset fixed values in many cases. Such a system can perform processing similar to the exemplary aspect of the invention as well through such processing as, for example, (1) directly changing variables for a CPU ID in memory by using system software; (2) making system software independent on a CPU ID unit; (3) generating an instruction trap by using instructions for referencing CPU ID and emulating a function by failure concealing device 1000, or the like. FIG. 11 schematically shows the entirety of such CPU ID read processing.

Figure 12:
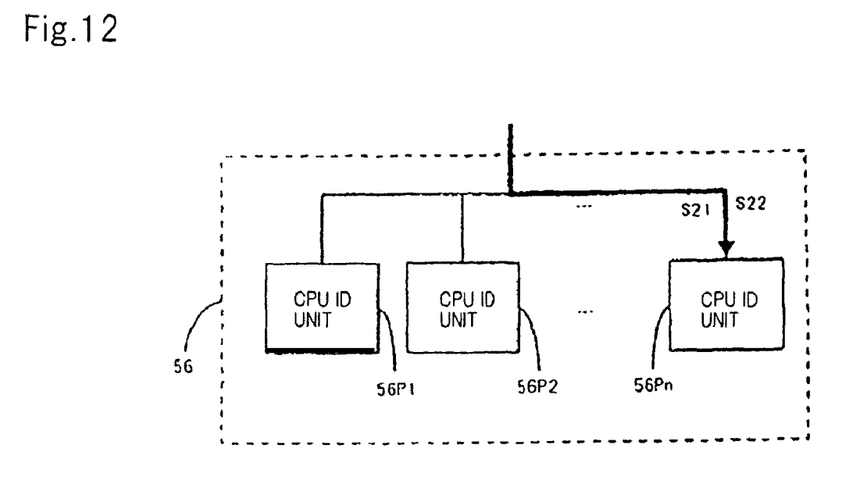
FIG. 12 is a block diagram schematically showing failure concealment processing by the CPU ID unit shown in FIG. 11.

FIG. 12 is a block diagram schematically showing failure concealment processing by the CPU ID unit shown in FIG. 11. S21-S22 shown in FIG. 12 indicate step numbers of failure concealment processing implemented by CPU ID unit 56.

Here, a description will be given of an example in which CPU 10P2 fails, so that OS 20P2 and execution environment 30P2 executed by this CPU 10P2 are moved to CPU 10Pn to conceal the failure. Assume that CPU 10Pn is executing PS 20Pn and execution environment 30Pn. In this event, CPU 10Pn executes SO 20Pn and execution environment 30Pn, which have been originally executed thereby, as well as OS 20P2 and execution environment 30P2 transferred from CPU 10P2 in time division.

When CPU 10P2 fails, CPU 10Pn first sets the value of CPU ID unit 56 Pn to a value (CPU ID) held by CPU ID unit 56 P2 (step S21) before executing OS 20P2 and execution environment 30P2 of CPU 10P2.

Next, CPU 10Pn executes OS 20P2 and execution environment 30P2, and after the lapse of a predetermined time, changes the value of CPU ID unit 56Pn to correspond with the OS and execution environment (for example, OS 20Pn and execution environment 30Pn) which are next executed (step S22).

Figure 13:
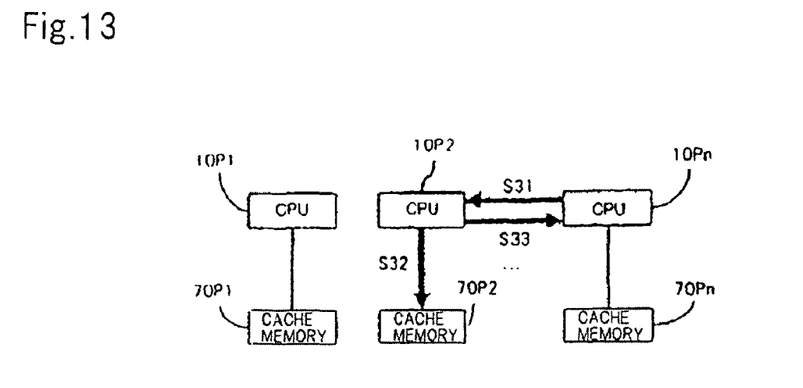
FIG. 13 is a block diagram schematically showing failure concealment processing by cache memory shown in FIG. 5.

FIG. 13 is a block diagram schematically showing failure concealment processing by cache memory shown in FIG. 5. S31-S33 shown in FIG. 13 indicate step numbers of failure concealment processing carried out by cache memory.

Here, a description will be given of an example in which CPU 10P2 fails, so that OS 20P2 and execution environment 30P2 executed by this CPU 10P2 are moved to CPU 10Pn to conceal the failure.

When CPU 10P2 fails, CPU 10Pn first sends an inter-CPU interrupt signal to CPU 10P2 for providing cache flush instructions (outputting held data) to CPU 10P2 (step S31).

When CPU 10P2 recognizes a flush request made to cache memory 70P2 of the CPU itself as the main cause for generating the interrupt signal in the received inter-CPU interrupt signal, CPU 10P2 saves data held in cache memory 70P2 into a main memory (for example, RAM 52) (step S32). Saving data into a main memory refers to processing for temporarily holding the data in the main memory.

Upon completion of the cache flush, CPU 10P2 sends an inter-CPU interrupt signal to CPU 10Pn to notify CPU 10Pn that cache flush has been completed (step S33). Any signal may be used instead of the inter-CPU interrupt signal as long as information can be communicated between CPUs.

Figure 14:
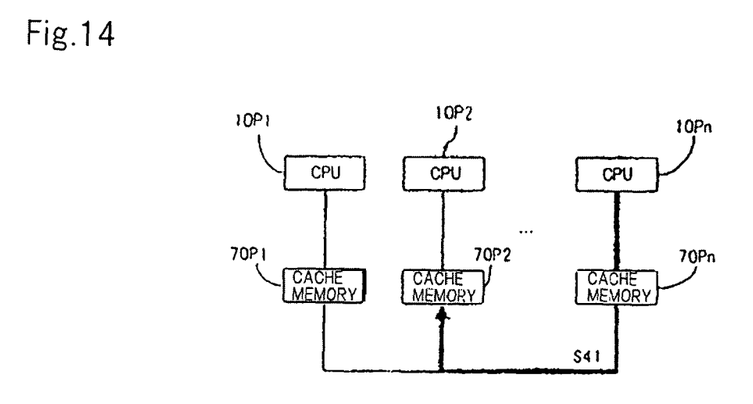
FIG. 14 is a block diagram schematically showing another example of failure concealment processing by cache memory shown in FIG. 5.

FIG. 14 is a block diagram schematically showing another example of failure concealment processing carried out by cache memory shown in FIG. 5. S41 shown in FIG. 14 indicates a step number of failure concealment processing by a CPU.

The failure concealment processing shown in FIG. 14, which differs from the example shown in FIG. 13, is an example applied to a case in which CPU 10P2 fails and cannot recover, so that the processing by CPU 10P2 cannot be executed as shown in FIG. 13.

Here, a description will be given of an example in which CPU 10P2 fails, so that OS 20P2 and execution environment 30P2 executed by this CPU 10P2 are moved to CPU 10Pn to conceal the failure. Assume that CPUs 10P1-10Pn can control the cache flush for cache memories 70P1-Pn shown in FIG. 5.

In such an event, when CPU 10P2 fails, CPU 10Pn saves data held in cache memory 70P2 into a main memory (for example, RAM 52) through system bus 60 (step S41).

Figure 15:
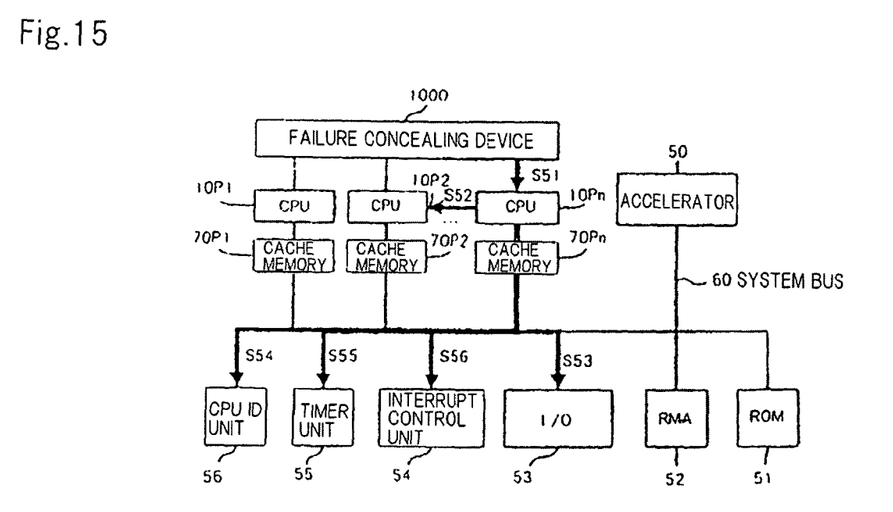
FIG. 15 is a block diagram schematically showing failure concealment processing by the information processing device shown in FIG. 5.

FIG. 15 is a block diagram schematically showing failure concealment processing executed by the information processing device shown in FIG. 5. S51-S56 shown in FIG. 15 indicate step numbers of the failure concealment processing executed by the information processing device.

Here, a description will be given of an example in which CPU 10P2 fails, so that OS 20P2 and execution environment 30P2 executed by CPU 10P2 are moved to CPU 10Pn to conceal the failure.

Failure concealing device 1000 notifies CPU 10Pn of a movement of execution environment 30P2 when it detects that a failure has occurred in CPU 10P2 (step S51).

Upon receipt of the notice from failure concealing device 1000, CPU 10Pn saves data held in cache memory 70P2 of CPU 10P2 into a main memory (for example RAM 52) in accordance with the procedure shown in FIG. 13 or FIG. 14 (step S52).

Next, CPU 10Pn uses those input/output devices which have been used by CPU 10P2 and which can be continuously used, and initializes those devices which cannot be continuously used as required (step S53).

Subsequently, CPU 10Pn performs failure concealment processing for CPU 10P2 by using CPU ID unit 56 in accordance with the procedure shown in FIG. 12 (step S54).

Next, CPU 10Pn performs failure concealment processing for CPU 10P2 by using timer unit 55 in accordance with the procedure shown in FIG. 10 (step S55).

Finally, CPU 10Pn performs failure concealment processing for CPU 10P2 by using interrupt control unit 54 in accordance with the procedure shown in FIG. 8 (step S56).

Figure 16:
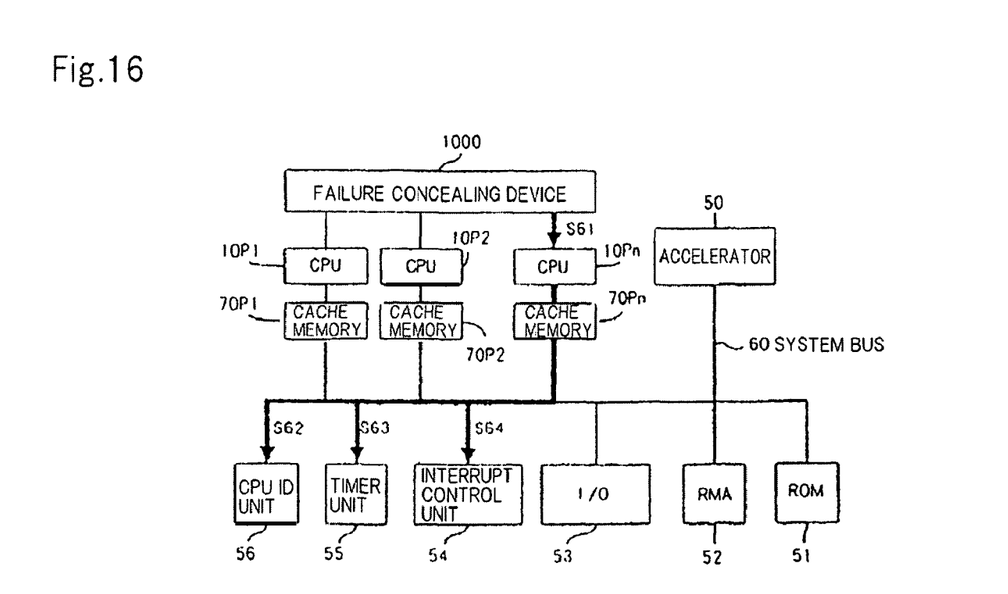
FIG. 16 is a block diagram schematically showing an OS and execution environment switching procedure carried out by the information processing device shown in FIG. 5.

FIG. 16 is a block diagram schematically showing an OS and execution environment switching procedure carried out by the information processing device shown in FIG. 5. S61-S64 shown in FIG. 16 indicate step numbers of the OS and execution environment switching procedure carried out by the information processing device.

Here, a description will be given of an example in which CPU 10P2 fails, as a result of which OS 20P2 and execution environment 30P2 executed by CPU 10P2 are moved to CPU 10Pn to conceal the failure. Assume that CPU 10Pn normally executes OS 20Pn and execution environment 30Pn.

Upon detection of a failure which has occurred in CPU 10P2, failure concealing device 1000 notifies CPU 10Pn that CPU 10Pn operates in execution environment 30P2 and on OS 20P2, based on a variety of triggering conditions such as the lapse of a predetermined time, a priority for the OS and execution environment, a switching instruction from the user, generation of an event, or the like (step S61).

Upon receipt of the notice from failure concealing device 1000, CPU 10Pn switches the value (CPU ID) of CPU ID unit 56 Pn of CPU ID unit 56 in accordance with the procedure shown in FIG. 12 (step S62).

Subsequently, CPU 10Pn switches a timer value of timer count unit 55 Pn of timer unit 55 in accordance with the procedure shown in FIG. 10 (step S63).

Finally, CPU 10Pn performs a switching operation for an interrupt signal by using interrupt control unit 54 in accordance with the procedure shown in FIG. 8 (step S64). The switching operation herein refers to failure concealment processing except for releasing of resources used by CPU 10P2.

Figure 17:
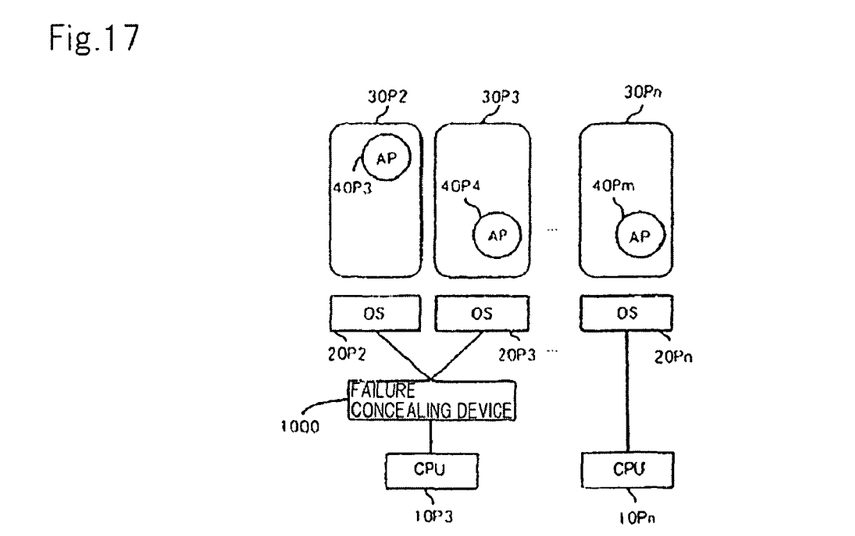
FIG. 17 is a block diagram schematically showing an exemplary execution of OSs and execution environments after failure concealment processing.

FIG. 17 is a block diagram schematically showing an exemplary execution of OS and execution environment after failure concealment processing.

Here, a description will be given of an example in which CPU 10P2 fails, as a result of which SO 20P2 and its execution environment 30P2 executed on CPU 10P2 will be continuously operated on CPU 10P3. In this event, CPU 10P3 will not only execute execution environment 30P3 and OS 20P3 but also execute execution environment 30P2 and OS 20P2.

Assume that CPU 10Pn normally executes execution environment 30Pn and OS 20Pn. Failure concealing device 1000 controls switching of OS 20P2 and OS 20P3 executed by CPU 10P3, and switching of execution environment 30P3 and execution environment 30P2, respectively.

Figure 18:
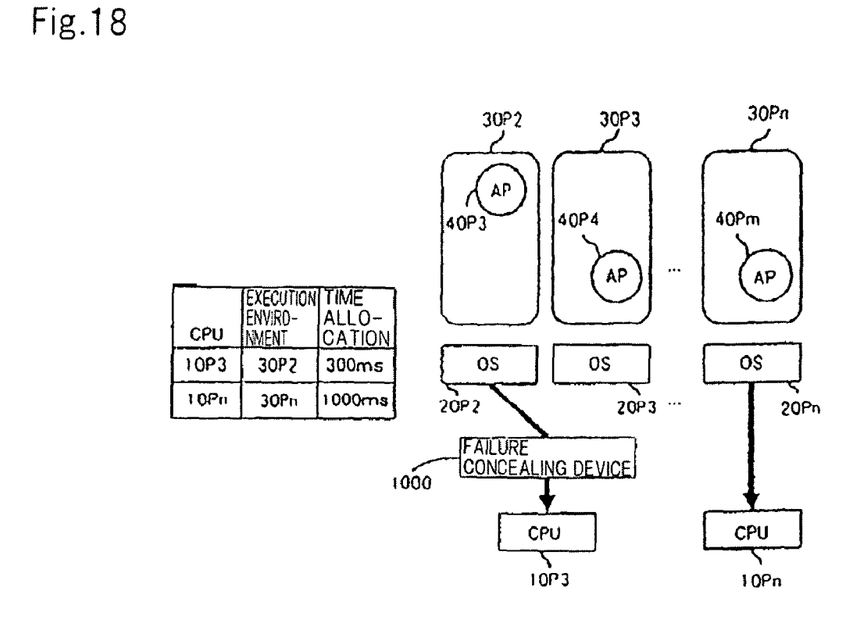
FIG. 18 is a block diagram schematically showing progress that occurs over time when exemplary execution of the OS and execution environments is carried out according to a failure concealing method of the exemplary aspect of the invention.

FIG. 18 is a block diagram schematically showing progress that occurs over time when exemplary execution of the OS and execution environments is carried out according to a failure concealing method of the exemplary aspect of the invention.

Assume herein that CPU 10P2 fails, so that CPU 10P3 instead of CPU 10P2 executes OS 20P2 and execution environment 30P2.

FIG. 18 shows that CPU 10P3 is executing OS 20P2 and execution environment 30P2 under the control of failure concealing device 1000. Assume that CPU 110P3 is allocated 300 ms for executing execution environment 30P2 (time allocation). Assume also that CPU 10Pn is executing execution environment 30Pn and OS 20Pn under the control of failure concealing device 1000. CPU 10Pn is allocated 1000 ms for executing execution environment 30Pn (time allocation).

Failure concealing device 1000 determines an OS and an execution environment which should be executed the next time when the remaining time allocated to CPU 10P3 for execution environment 30P2 decreases to 0 ms, and switches the OS and execution environment, for example, in accordance with the procedure shown in FIG. 16. The switching of the OS and execution environment may be performed based not only on the time allocation but also on a variety of triggering conditions such as priorities for the OSs and execution environments, a switching instruction from the user, generation of an event, or the like.

Figure 19:
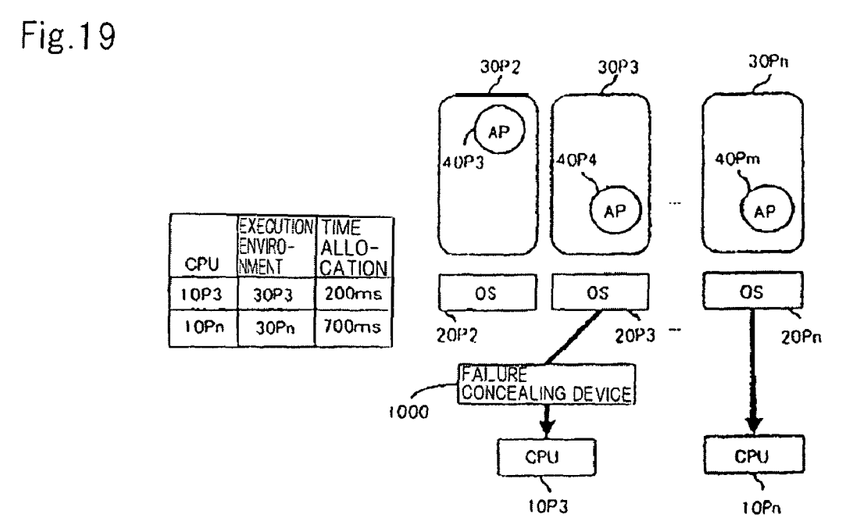
FIG. 19 is a block diagram schematically showing progress that occurs over time when exemplary execution of the OS and execution environments is carried out according to a failure concealing method of the exemplary aspect of the invention.

FIG. 19 is a block diagram schematically showing progress that occurs over time when exemplary execution of the OS and execution environments is carried out according to a failure concealing method of the exemplary aspect of the invention. FIG. 19 shows a state when approximately 300 ms has elapsed from the state shown in FIG. 18. FIG. 19 shows that CPU 10P3 is executing OS 20P3 and execution environment 30P3 under the control of failure concealing device 1000. Assume that CPU 10P3 is allocated 200 ms for executing execution environment 30P3 (time allocation).

Failure concealing device 1000 determines that CPU 10P3 next executes OS 20P3 and execution environment 30P3, and then switches the OS and execution environment in accordance with the procedure shown in FIG. 16. As a result, OS 20P2 and execution environment 30P2 operate as if CPU 10P2 exists.

Figure 20:
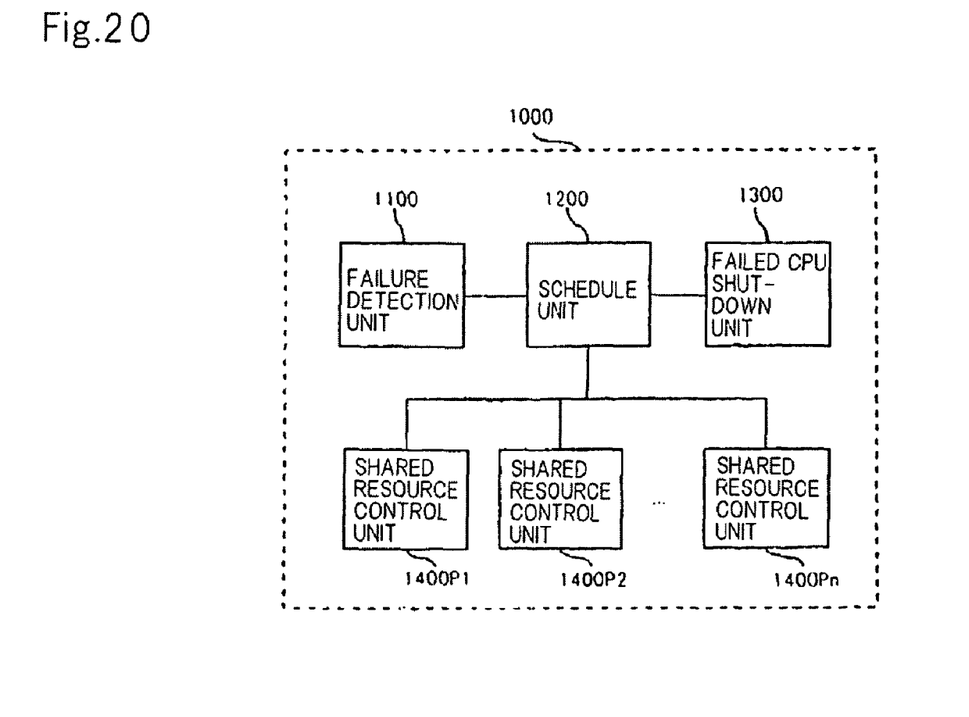
FIG. 20 is a block diagram showing an exemplary configuration of a failure concealing device shown in FIG. 5.

FIG. 20 is a block diagram showing an exemplary configuration of the failure concealing device shown in FIG. 5.

As shown in FIG. 20, failure concealing device 1000 comprises failure detection unit 1100 for detecting a failure that has occurred in CPUs 10P1-Pn, schedule unit 1200 for managing an operation schedule of an OS and execution environment by using a non failed CPU which operates instead of a failed CPU, failed CPU shut-down unit 1300 for stopping the operation of a CPU whose failure has been detected, and shared resource control units 1400P1-Pn for controlling shared resources operated on CPUs 10P1-Pn.

Failure detection unit 1100 detects whether or not a failure will occurs in a plurality of CPUs 10P1-Pn included in the information processing device. Whether or not a CPU will fails may be determined by a diagnosis program executed on a periodic basis, an abnormality notice sent from hardware when a failure is detected, or the like. The failure detection method is not limited to these methods, but any known method may be used as long as it can detect a failed CPU.

Schedule unit 1200 comprises a function of determining a CPU which serves as a successor for an OS and an execution environment of the failed CPU, shown in FIG. 15, and a control function for operating OSs and execution environments in time division, shown in FIGS. 16, 18, and 19. Schedule unit 1200 determines a CPU which serves as a successor for an OS and an execution environment based on failed CPU information received from failure detection unit 1100, indicative of a CPU whose failure has been detected, and gives necessary instructions to failed CPU shut-down unit 1300 and shared resource control units 1400P1-Pn in accordance with the processing result of a control function for operating the OS and execution environment in time division.

Failed CPU shut-down unit 1300 executes failure concealment processing carried out by cache memory shown in FIG. 13 or 14 in accordance with instructions from schedule unit 1200, and also performs processing for shutting down a CPU whose failure has been detected.

Shared resource control units 1400P1-Pn commonly operate for a plurality of CPUs 10P1-Pn. Shared resource control units 1400P1-Pn conduct control for releasing shared resources which have been used by a failed CPU, as shown in FIGS. 8, 10, and 12 and for making shared resources currently used by a CPU, to which an OS and an execution environment are moved, and shared resources so far used by the failed CPU, available in time division.

Figure 21:
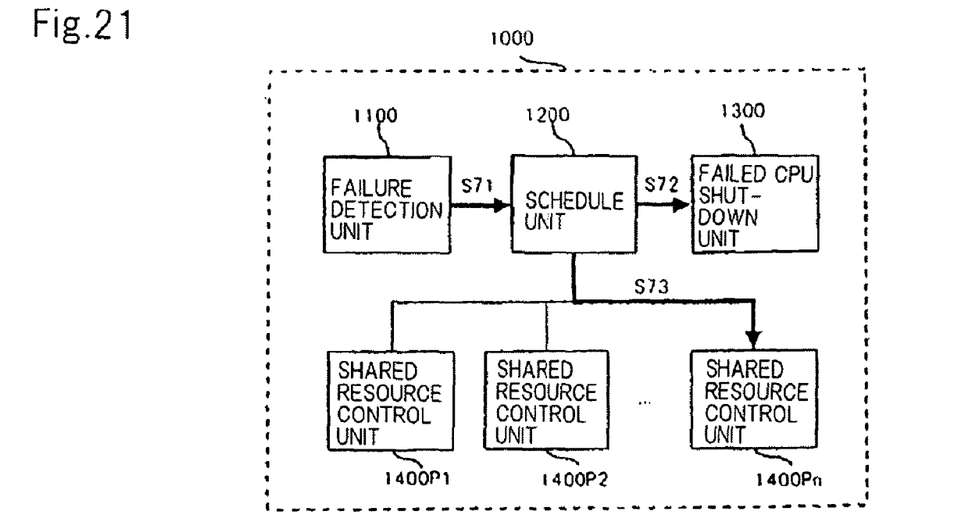
FIG. 21 is a block diagram schematically showing failure concealment processing by the failure concealing device shown in FIG. 20.

FIG. 21 is a block diagram schematically showing failure concealment processing implemented by the failure concealing device shown in FIG. 20. S71-S74 shown in FIG. 21 indicate step numbers of the failure concealment processing implemented by the failure concealing device.

Here, a description will be given of an example in which CPU 10P2 fails, as a result of which OS 20P2 and execution environment 30P2 executed by this CPU 10P2 are moved to CPU 10Pn to conceal the failure. Assume that CPU 10Pn is executing execution environment 30Pn and OS 20Pn. The operation shown in FIG. 21 corresponds to failure concealment processing implemented by the information processing device shown in FIG. 15.

When failure detection unit 1100 detects a failure which has occurred in CPU 10P2, failure concealing unit 1000 notifies schedule unit 1200 of the occurrence of the failure (step S71).

Schedule unit 1200 determines to move OS 20P2 and execution environment 30P2 executed by failed CPU 10P2 to CPU 10Pn, and notifies failed CPU shut-down unit 1300 that the operation of CPU 10P2 has been stopped (step S72).

Failed CPU shut-down unit 1300 flushes data held by cache memory 70P2 of failed CPU 10P2, and stops the operation of CPU 10P2 in accordance with the notice from schedule unit 1200 (step S73).

Next, schedule unit 1200 notifies shared resource control unit 1400Pn that CPU 10Pn will operate instead of failed CPU 10P2.

Shared resource control unit 1400Pn forces CPU 10P2 to stop using shared resources, and controls a switching of shared resources used by CPU 10Pn to execute OS 20P2 and execution environment 30P2 as well as OS 20Pn and execution environment 30Pn in time division (step S74).

Figure 22:
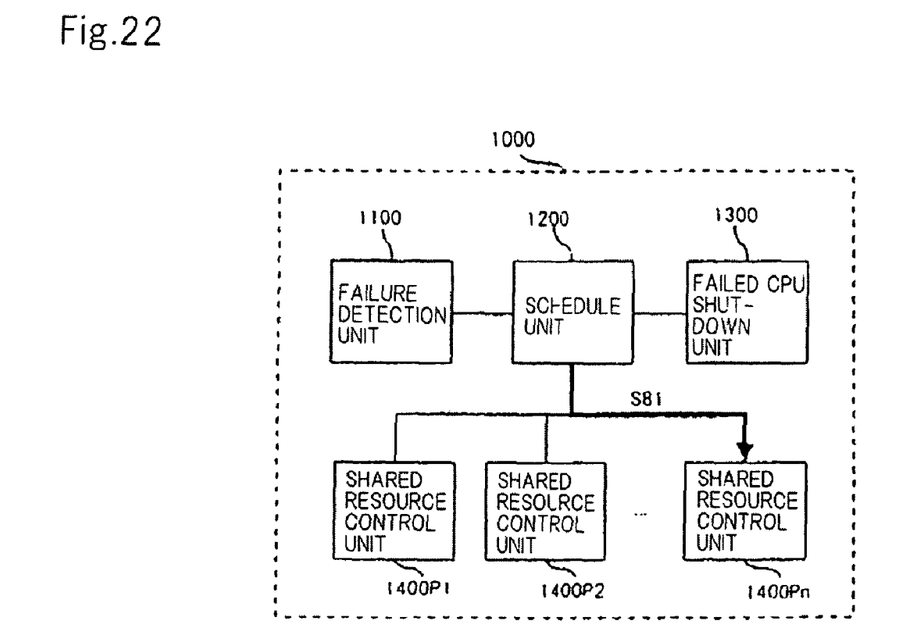
FIG. 22 is a block diagram schematically showing another example of the failure concealment processing by the failure concealing device shown in FIG. 20.

FIG. 22 is a block diagram schematically showing another example of failure concealment processing implemented by the failure concealing device shown in FIG. 20. S81 shown in FIG. 22 indicates a step number of failure concealment processing implemented by the failure concealing device.

Here, a description will be given of an example in which CPU 10P2 fails, as a result of which OS 20P2 and its execution environment 30P2 executed by this CPU 10P2 are moved to CPU 10Pn to conceal the failure. Assume that CPU 10Pn is executing execution environment 30Pn and OS 20Pn. The operation shown in FIG. 22 corresponds to failure concealment processing implemented by the information processing device shown in FIG. 16.

When failure detection unit 1100 detects a failure which has occurred in CPU 10P2, failure concealing unit 1000 notifies schedule unit 1200 of the occurrence of the failure (step S81).

Schedule unit 1200 notifies shared resource control unit 1400Pn that OS 20P2 and execution environment 30P2 currently executed by failed CPU 10P2 will be moved to CPU 10Pn in accordance with triggering conditions defined by the lapse of a predetermined time, an interrupt signal and the like.

Shared resource control unit 1400Pn switches shared resources used for OS 20Pn and execution environment 30Pn currently executed by CPU 10Pn to shared resources used for OS 20P2 and execution environment 30P2. When switching of the shared resources have been completed, CPU 10Pn executes OS 20P2 and execution environment 30P2.

Figure 23:
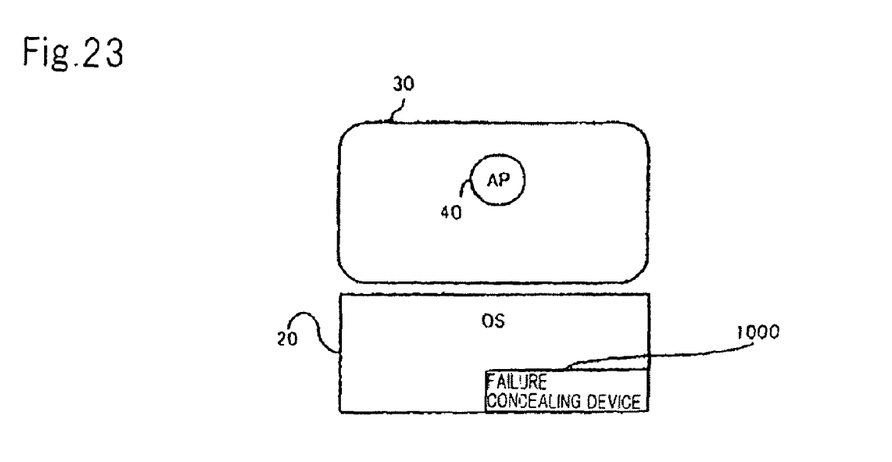
FIG. 23 is a block diagram showing an exemplary configuration of the failure concealing device shown in FIG. 5 when it is implemented by a program.

FIG. 23 is a block diagram showing an exemplary configuration of the failure concealing device shown in FIG. 5 when it is implemented by a program.

FIG. 23 is an example of implementing functions of failure concealing device 100 described above by a CPU which executes processing in accordance with a program included in an OS. Failure concealing device 1000 shown in FIG. 23 can be made in any configuration including modules, sub-systems and the like. The configuration as shown in FIG. 23 advantageously facilitates modifications because the functions of failure concealing device 1000 can be incorporated in the OS.

Figure 24:
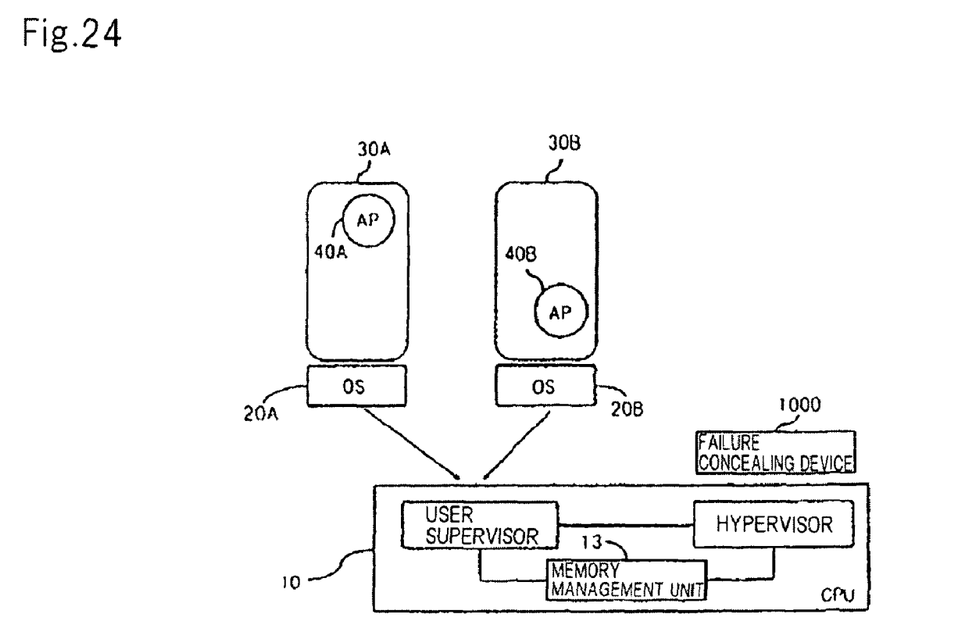
FIG. 24 is a block diagram showing another exemplary configuration of the failure concealing device shown in FIG. 5 when it is implemented by a program.

FIG. 24 is a block diagram showing another exemplary configuration of the failure concealing device shown in FIG. 5 when it is implemented by a program.

CPU 10 shown in FIG. 24 operates not only in a user supervisor mode but also in a hypervisor mode, and comprises memory management unit 13 which is shared in these operation modes. In this event, OS 20A and execution environment 30A as well as OS 20B and execution environment 30B are executed in the user supervisor mode. On the other hand, a program for implementing functions of failure concealing device 1000 operates in the hypervisor mode.

In such a configuration, since the OSs and execution environments are executed in a different operation mode from that of failure concealment processing, a failure can be concealed while maintaining software compatibility with the OSs and execution environments.

According to the exemplary aspect of the invention, failure concealing device 1000 determines a substitutional processing unit that will operate instead of a failed CPU, switches an OS and an execution environment which have been operated on the failed processing unit to operations executed by the determined processing unit, and switches shared resources currently used by the failed CPU such that they are available to the substitutional processing unit, so that even if any processing unit fails in an information processing device which has a plurality of CPUs and shared resources, each OS can be continuously operated without replacing a chip. Accordingly, since a failure which has occurred in a semiconductor integrated circuit device is concealed by an information processing device which is a system using the semiconductor integrated circuit device, the test cost can be reduced for the semiconductor integrated circuit device.

The present invention is suitable for information processing devices which operate in an environment where maintenance is difficult because the lifetime of semiconductor integrated circuit devices can extend.

The invention claimed is:

1. An information processing device comprising:
   a plurality of processing units for OSs and execution environments for executing applications to operate thereon; and
   a plurality of peripheral devices shared by said plurality of processing units,
   wherein said information processing device comprises:
   a failure concealing device for concealing a failure which has occurred in any of said processing units,
   wherein said failure concealing device, responsive to a failure which has occurred in any of said plurality of processing units,
   determines a substitutional processing unit in said plurality of processing units that time-multiplexingly executes a first OS and a first execution environment executed originally by said substitutional processing unit, and a second OS and a second execution environment which have operated on said failed processing unit,
   switches the second OS and the second execution environment to an operation executed by said substitutional processing unit, and
   switches a first peripheral device currently used by said failed processing unit to a second peripheral device used by said substitutional processing unit such that the second peripheral device is time-shared between the first OS and the first execution environment, and the second OS and the second execution environment, or switches between the first peripheral device and the second peripheral device such that the first peripheral device and the second peripheral device are used for the first OS and the first execution environment, and the second OS and the second execution environment, respectively.

2. The information processing device according to claim 1, wherein:
   said failure concealing device switches the second OS and the second execution environment to operate on said substitutional processing unit based on triggering conditions including the lapse of a predetermined time, priorities for the first OS and the first execution environment and the second OS and the second execution environment, a switching instruction from a user, and generation of an event.

3. The information processing device according to claim 2, wherein:
   upon detection of a failure in said processing unit, said failure concealing device saves data held in cache memory included in said failed processing unit into a main memory.

4. The information processing device according to claim 1, wherein:
   said failure concealing device is implemented by one of said plurality of processing units which executes processing in accordance with a program included in one of the OSs.

5. The information processing device according to claim 1, wherein:
   said plurality of processing units operate in at least two operation modes, and
   said failure concealing device is implemented by one of said plurality of processing units which executes processing in accordance with a program included in one of the OSs in one of the at least two CPU operation modes.

6. A failure concealing device for concealing a failure which has occurred in any of a plurality of processing units on which execution environments operate for executing an OS and an application, the plurality of processing units sharing a plurality of peripheral devices, the failure concealing device comprising:
    a failure detection unit for detecting said failed processing unit;
    a schedule unit, responsive to information received from said failure detection unit indicative of said failed processing unit, for determining a substitutional processing unit in said plurality of processing units that time multiplexingly executes a first OS and a first execution environment executed originally by said substitutional processing unit, as well as a second OS and a second execution environment which have operated on said failed processing unit, and for managing an operation schedule for the first OS and the first execution environment and the second OS and the second execution environment on said substitutional processing unit;
    a failed CPU shut-down unit for stopping the operation of said failed processing unit; and
    a shared resource control unit for making a shared peripheral device used as a first peripheral device used so far by said failed processing unit available and a second peripheral device used so far by said substitutional processing unit such that the shared peripheral device is time-shared between the first OS and the second OS, or for making the first peripheral device and the second peripheral device be used time multiplexingly by said substitutional processing unit such that the first peripheral device and the second peripheral device are used for the first OS and the first execution environment, and the second OS and the second execution environment, respectively.

7. The failure concealing device according to claim 6, wherein:
    said schedule unit instructs said failed CPU shut-down unit and said shared resource control unit such that the second OS and the second execution environment operate on said substitutional processing unit, based on triggering conditions including the lapse of predetermined time priorities for the first OS and the first execution environment and the second OS and the second execution environment, a switching instruction from a user, and generation of an event.

8. The failure concealing device according to claim 7, wherein:
    said failed CPU shut-down unit saves data held by cache memory included in said failed processing unit into a main memory.

9. The failure concealing device according to claim 6, implemented by one of said plurality of processing units which executes processing in accordance with a program included in one of the OSs.

10. A failure concealing method for an information processing device comprising a plurality of processing units for OSs and execution environments for executing applications to operate thereon, and a plurality of peripheral devices shared by said plurality of processing units, for concealing a failure which has occurred in any of said processing units, said method comprising:
    upon detection of a failure which has occurred in any of said plurality of processing units, determining a substitutional processing unit in said plurality of processing units that time multiplexingly executes a first OS and a first execution environment executed originally by said substitutional processing unit as well as a second OS and a second execution environment which have operated on said failed processing unit;
    switching the second OS and the second execution environment to an operation executed by said substitutional processing unit; and
    switching a first peripheral device currently used by said failed processing unit to a second peripheral device used by said substitutional processing unit such that the second peripheral device is time-shared between the first OS and the first execution environment and the second OS and the second execution environment, or switching between the first peripheral device and the second peripheral device such that the first peripheral device and the second peripheral device are used for the first OS and the first execution environment, and the second OS and the second execution environment, respectively.

11. The failure concealing method according to claim 10, further comprising:
    switching the second OS and the second execution environment to operate on said substitutional processing unit based on triggering conditions including the lapse of a predetermined time, priorities for the first OSs and the first execution environment and the second OS and the second execution environment, a switching instruction from a user, and generation of an event.

12. The failure concealing method according to claim 11, further comprising:
    upon detection of a failure in said processing unit, saving data held by cache memory included in said failed processing unit into a main memory.

* * * * *